United States Patent [19]

Bleiweiss

[11] Patent Number: 5,489,211
[45] Date of Patent: Feb. 6, 1996

[54] METHOD OF SIMULATING THE PRESENCE OF CLOUDS IN A SCENE

[75] Inventor: Max P. Bleiweiss, Las Cruces, N.M.

[73] Assignee: The United States of America as represented by the Secretary of the Army, Washington, D.C.

[21] Appl. No.: 266,405

[22] Filed: Jun. 27, 1994

[51] Int. Cl.$^6$ .............................. G01S 13/95; G06F 15/54
[52] U.S. Cl. ......................... 434/2.000; 364/420; 342/26
[58] Field of Search ................................ 434/2; 364/420; 342/26

[56] References Cited

U.S. PATENT DOCUMENTS

| | | | |
|---|---|---|---|
| 4,016,658 | 4/1977 | Porter et al. | 434/41 |
| 4,493,647 | 1/1985 | Cowdrey | 434/2 |
| 5,135,397 | 8/1992 | Yen | 434/2 |
| 5,192,208 | 3/1993 | Ferguson et al. | 434/2 |
| 5,379,215 | 1/1995 | Kruhoeffer et al. | 364/420 |
| 5,409,379 | 4/1995 | Montag et al. | 434/2 |

OTHER PUBLICATIONS

Vonder et al., "Analysis and Assessment of the Atmospheric Transmittance Large Area System", 1990.
Bleiweiss et al., "A Comparison of MPTR and ATLAS Transmissometers", Proceedings of the Smoke/Obscurants Symposium XV, 1991.
Gardner et al., "Visualization of Battlefield Obscurants", Proceeding of the 1991 Battlefield Atmospheric Conference, 1992.
Hoock, "Theoretical and Measured Fractal Dimension for Battlefield Aerosol Cloud Visualization and Transmission, Proceedings of the 1991 Battlefield Atmospheric Conference", 1992.
Hoock, "Modeling Time–Dependent Obscuration for Simulated Imaging of Dust and Smoke Clouds", SPIE vol. 1486 Characterization, Propagation, and Simulation of Sources and Backgrounds, pp. 164–175, 1992.
Smith et al., "Improved COMBIC and Fractal Smoke Models for Use in the TACOM Thermal Image Model (TTIM)", Proceedings of the Tenth Annuas EOSAEL/TWI Conference, 1990.

*Primary Examiner*—John B. Sotomayor
*Attorney, Agent, or Firm*—Freda L. Krosnick; Muzio B. Roberto

[57] ABSTRACT

The present invention discloses a method of incorporating at least one copy of a real a cloud into a simulated or real two-dimensional scene by extracting the radiance and transmittance from a real cloud; converting the radiance and transmittance of the cloud to the radiance and transmittance of a desired material such as brass, aluminum, copper, or graphite; adding at least one copy of the resulting cloud to the simulated two-dimensional scene; and scaling each cloud in the simulated two-dimensional scene so that each cloud appears at a desired location. The present invention uses the Atmospheric Transmission Large-Area Analysis System to extract the radiance and transmittance of a real cloud. The present invention can also change the infrared image of a cloud by extracting the radiance and transmittance of the cloud at one wavelength of light. Changing the material of the cloud is accomplished by using Beer's Law to convert the transmittance values to optical depth and recalculating the transmittance using the mass extinction coefficient of the desired material. The cloud in the simulated two-dimensional scene can also be moved within the scene according to the meteorological conditions or topography of the scene.

17 Claims, No Drawings

METHOD OF SIMULATING THE PRESENCE OF CLOUDS IN A SCENE

TECHNICAL FIELD OF THE INVENTION

The present invention pertains to a method of simulating the presence of clouds in a scene and, more particularly, to a method of simulating real clouds of various compositions in a two-dimensional scene.

BACKGROUND OF THE INVENTION

Research is being conducted in an attempt to realistically model smoke and/or obscurant clouds for use in simulations of real and artificial scenes. For the simulation of real clouds in two dimensions, it is desirable to know the two-dimensional field of view of the observer, the two-dimensional distribution of aerosol concentration in the cloud to be simulated, the aerosol radiance of the cloud to be simulated, and the path radiance of the cloud to be simulated due to scattered radiation. These parameters, except for path radiance due to scattering, can be obtained using the Atmospheric Transmission Large-Area Analysis System (ATLAS).

ATLAS is disclosed in an article entitled "Analysis and Assessment of the Atmospheric Transmittance Large Area System (ATLAS)," by Haar Vonder, T. G. Stephens, A. Jones, C. F. Shih, and J. Davis, of Metsat Inc., Fort Collins, Colo., in 1990, and in another article entitled "A Comparison of the MPTR and ATLAS Transmissometers," by M. P. Bleiweiss, R. Howerton, R. Valdez, K. Payne, T. King, and K. Hutchison, in 1991, in the Proceedings of the Smoke/Obscurants Symposium XV, U.S. Chemical Research Development and Engineering Center, Aberdeen Proving Ground, Md. 21010. ATLAS allows real smoke clouds to be extracted from a scene and saved for later insertion into real or artificial scenes.

ATLAS uses a simplified form of an equation of radiative transfer applied to infrared imagery to produce a two-dimensional transmittance map of a cloud and the cloud radiance in a plane perpendicular to the line of sight of an observer. The present invention operates on any scenes, using the derived radiance and transmittance of the cloud to arrive at a new scene with the cloud affects present in a physically correct manner.

An equation for radiative transfer to infrared imagery is as follows:

$$LR(i,j)=LO(i,j)T(i,j)+LC[1-T(i,j)]+LS(i,j),$$

where $LO(i,j)$ is the radiance from scene element $(i,j)$ in clear air, $T(i,j)$ is the transmittance of the smoke cloud for the $(i,j)$ scene element, $LC$ is the radiance of the smoke cloud due to the thermal emission of the aerosol that makes up the cloud, and $LS(i,j)$ is the path radiance due to scattering. ATLAS simplifies this equation by ignoring the path radiance due to scattering. This does not mean that path radiance due to scattering is not important. Path radiance is ignored because it is difficult to account for and is many times a small affect. The simplified equation can be rearranged to yield the following expression for transmittance:

$$T=(LR-LC)/(LO-LC).$$

Whereas the present invention deals with adding real clouds to simulated or real two-dimensional scenes, the following four articles deal with creating artificial clouds in simulated two-dimensional scenes: "Visualization of Battlefield Obscurants," by G. Y. Gardner and G. M. Hardaway, 1992, in Proceeding of the 1991 Battlefield Atmospheric Conference; "Theoretical and Measured Fractal Dimensions for Battlefield Aerosol Cloud Visualization and Transmission," by D. W. Hoock, 1992, in Proceedings of the 1991 Battlefield Atmospheric Conference; "Modeling Time-Dependent Obscuration for Simulated Imaging of Dust and Smoke Clouds," by D. W. Hoock, 1991, in SPIE Vol. 1486 Characterization, Propagation, and Simulation of Sources and Backgrounds, pp. 164–175; and "Improved COMBIC and Fractal Smoke Models for Use in the TACOM Thermal Image Model (TTIM)," by F. G. Smith, C. S. Hall, T. J. Rogne, and J. L. Manning, 1990, in Proceedings of the Tenth Annual EOSAEL/TWI Conference.

U.S. Pat. No. 4,493,647, entitled WEATHER RADAR SIMULATOR, discloses a device for simulating a weather radar in an aircraft simulator. The device of U.S. Pat. No. 4,493,647 generates a radar signal for different cloud formations that are stored in a memory device. U.S. Pat. No. 4,493,647 does not add real clouds to a simulated two-dimensional scene as the present invention does.

U.S. Pat. No. 5,192,208, entitled RADAR SIMULATION FOR USE WITH A VISUAL SIMULATOR, discloses a device for and method of producing visual images of terrain along with a radar image of the same terrain. U.S. Pat. No. 5,192,208 does not add real clouds to a simulated two-dimensional scene, have the ability to change the composition of the clouds, or have the ability to move the clouds with respect to meteorological conditions or topography as the present invention does.

U.S. Pat. No. 5,135,397, entitled 3-D WEATHER FOR DIGITAL RADAR LANDMASS SIMULATION, discloses a device for and method of compressing/decompressing weather-pattern data for use in a digital radar landmass simulator. U.S. Pat. No. 5,135,397 does not add clouds to a simulated two-dimensional scene as the present invention does.

SUMMARY OF THE INVENTION

It is an object of the present invention to simulate a real cloud in a real or artificial two-dimensional scene. It is another object of the present invention to change the composition of the cloud. It is another object of the present invention to change the scale and placement of the cloud. It is another object of the present invention to have the cloud move according to meteorological conditions or topography of the simulated scene.

The present invention discloses a method of placing real smoke clouds into a real or artificial scene. The present invention employs the simplified radiative transfer equation used in ATLAS to extract smoke clouds from a scene in a manner that allows these clouds to be placed into another scene. The simplified equation of ATLAS is used to extract the radiance and transmittance of a real cloud. The radiance and transmittance of the cloud is then applied to every pixel of the scene using the equation of resistive transfer. The transmittance value of the cloud can be changed, using Beer's Law, in order to obtain clouds of different material. The cloud can also be viewed at a different particular wavelength in order to change the infrared image of the cloud. Multiple copies of a cloud can also be added to the simulated scene. The scale and placement of the cloud can be controlled to make the clouds look near or distant. The cloud can also be made to move according to the meteorological conditions or topography of the simulated scene.

DETAILED DESCRIPTION

The objects of the present invention are realized by a method that uses the simplified radiative equation of ATLAS to extract a real cloud from a scene. The simplified equation, solved for transmittance, is as follows:

$$T=(LR-LC)/(LO-LC),$$

where T is the transmittance of the smoke cloud of the scene, LR is the radiance from the scene in the presence of the smoke cloud, LO is the radiance from the scene in clear air, and LC is the radiance of the smoke cloud due to the thermal emission of the aerosol that makes up the cloud.

The radiance and transmittance of the real cloud is then added to each pixel (using the equation of resistive transfer) in the field of view of the simulated scene. The placement and scale of the resulting cloud in the simulated a real scene can be controlled in order to make the cloud look near or distant.

Since one aerosol diffuses and transports as much as another aerosol, Beer's Law can be used to change the composition of the cloud. For example, the use of Beer's Law allows a brass cloud to be changed to an aluminum, graphite, or other type of cloud. This is accomplished by converting the transmittance values of the original cloud to optical depth and recalculating the optical depths using the mass extinction coefficient of the desired material of the cloud. Beer's Law is as follows:

$$T=e-(alpha)CL=e-(tau),$$

where T is transmittance, alpha is the mass extinction coefficient for a particular material, CL is the path integrated concentration, and tau is optical depth.

The cloud added to the simulated or real scene can also be made to move according to either the meteorological condition or topography of the simulated scene.

What is claimed is:

1. A method of incorporating the radiance and transmittance of a real cloud into a simulated a real two-dimensional scene, comprising the steps of:
    a) extracting the radiance and transmittance from a depiction of a real cloud;
    b) converting the radiance and transmittance of the previous step to the radiance and transmittance of a desired material;
    c) applying the result of the previous step to a simulated two-dimensional scene at least once; and
    d) scaling each application of the previous step to a size that depicts a desired nearness of each cloud added to the simulated two-dimensional scene.

2. The method of claim 1, wherein said step of extracting the radiance and transmittance from a depiction of a real cloud is accomplished by using the Atmospheric Transmission Large-Area Analysis System.

3. The method of claim 1, wherein said step of extracting the radiance and transmittance from a depiction of a real cloud is accomplished by extracting the radiance and transmittance of a real cloud for one wavelength of light.

4. The method of claim 1, wherein said step of converting the radiance and transmittance of a real cloud further comprises the steps of:
    a) converting the transmittance values of the real cloud to optical depth using Beer's Law; and
    b) recalculating the transmittance of the real cloud using the mass extinction coefficient value of a desired material for the cloud.

5. The method of claim 4, wherein said step of recalculating the transmittance is accomplished by recalculating the transmittance using the mass extinction coefficient of a material from the list of materials that includes brass, aluminum, copper, and graphite.

6. The method of claim 1, further comprising the step of moving the real cloud in the simulated scene.

7. The method of claim 6, wherein said step of moving the real cloud is accomplished by moving the real cloud according to desired meteorological conditions of the simulated or real scene.

8. The method of claim 6, wherein said step of moving the real cloud is accomplished by moving the real cloud according to the topography of the simulated or real scene.

9. The method of claim 2, wherein said step of extracting the radiance and transmittance from a depiction of a real cloud is accomplished by extracting the radiance and transmittance of a real cloud for one wavelength of light.

10. The method of claim 9, wherein said step of converting the radiance and transmittance of a real cloud further comprises the steps of:
    a) converting the transmittance values of the real cloud to optical depth using Beer's Law; and
    b) recalculating the transmittance of the real cloud using the mass extinction coefficient value of a desired material for the cloud.

11. The method of claim 10, wherein said step of recalculating the transmittance is accomplished by recalculating the transmittance using the mass extinction coefficient of a material from the list of materials that includes brass, aluminum, copper, and graphite.

12. The method of claim 11, further comprising the step of moving the real cloud in the simulated or real scene.

13. The method of claim 12, wherein said step of moving the real cloud is accomplished by moving the real cloud according to desired meteorological conditions of the simulated or real scene.

14. The method of claim 12, wherein said step of moving the real cloud is accomplished by moving the real cloud according to the topography of the simulated or real scene.

15. The method of claim 10, further comprising the step of moving the real cloud in the simulated or real scene.

16. The method of claim 15, wherein said step of moving the real cloud is accomplished by moving the real cloud according to desired meteorological conditions of the simulated or real scene.

17. The method of claim 15, wherein said step of moving the real cloud is accomplished by moving the real cloud according to the topography of the simulated or real scene.

* * * * *